(12) United States Patent
Ku et al.

(10) Patent No.: US 6,652,624 B2
(45) Date of Patent: Nov. 25, 2003

(54) SELF-CLEANING NOZZLES OF WET SCRUBBER

(75) Inventors: Yi-Lang Ku, Miao-Li Hsien (TW); Chieh-Chung Wang, Hsin-Chu Hsien (TW)

(73) Assignee: Taiwan Semiconductor Manufacturing Co., Ltd., Hsin Chu (TW)

( * ) Notice: Subject to any disclaimer, the term of this patent is extended or adjusted under 35 U.S.C. 154(b) by 109 days.

(21) Appl. No.: 09/975,180

(22) Filed: Oct. 10, 2001

(65) Prior Publication Data

US 2003/0066421 A1 Apr. 10, 2003

(51) Int. Cl.[7] ............................................... B01D 47/06
(52) U.S. Cl. ..................... 95/19; 95/149; 96/244; 96/253; 239/107
(58) Field of Search ................ 95/20, 19, 149; 96/421, 244, 243, 253, 322, 260, 261, 281; 239/106, 107

(56) References Cited

U.S. PATENT DOCUMENTS

| | | | | |
|---|---|---|---|---|
| 969,287 A | * | 9/1910 | Kinaely | |
| 1,088,318 A | * | 2/1914 | Bicalky | |
| 4,368,058 A | * | 1/1983 | Crowley | |
| 4,609,386 A | * | 9/1986 | Sibley | |
| 4,846,850 A | * | 7/1989 | Webb | |
| 5,215,254 A | * | 6/1993 | Haruch | |
| 5,232,156 A | * | 8/1993 | Csordas et al. | |
| 5,238,657 A | * | 8/1993 | Kuivalainen | |
| 5,322,223 A | * | 6/1994 | Hadar | |
| 5,553,782 A | * | 9/1996 | Licht et al. | |
| 5,588,594 A | * | 12/1996 | Kah, Jr. | |

* cited by examiner

Primary Examiner—Duane S. Smith
(74) Attorney, Agent, or Firm—Tung & Associates

(57) ABSTRACT

A self-cleaning nozzle that can be used for wet scrubbers comprises an electromagnetic coil that, when energized, causes an outlet orifice of the nozzle to enlarge so that pollutant particles clogging the nozzle fall down the orifice unclogging it. The coil is in turn controlled by a signal responsive to an increased pressure in the pipe supplying the nozzle with water, which increase is indicative of clogging the nozzle.

14 Claims, 3 Drawing Sheets

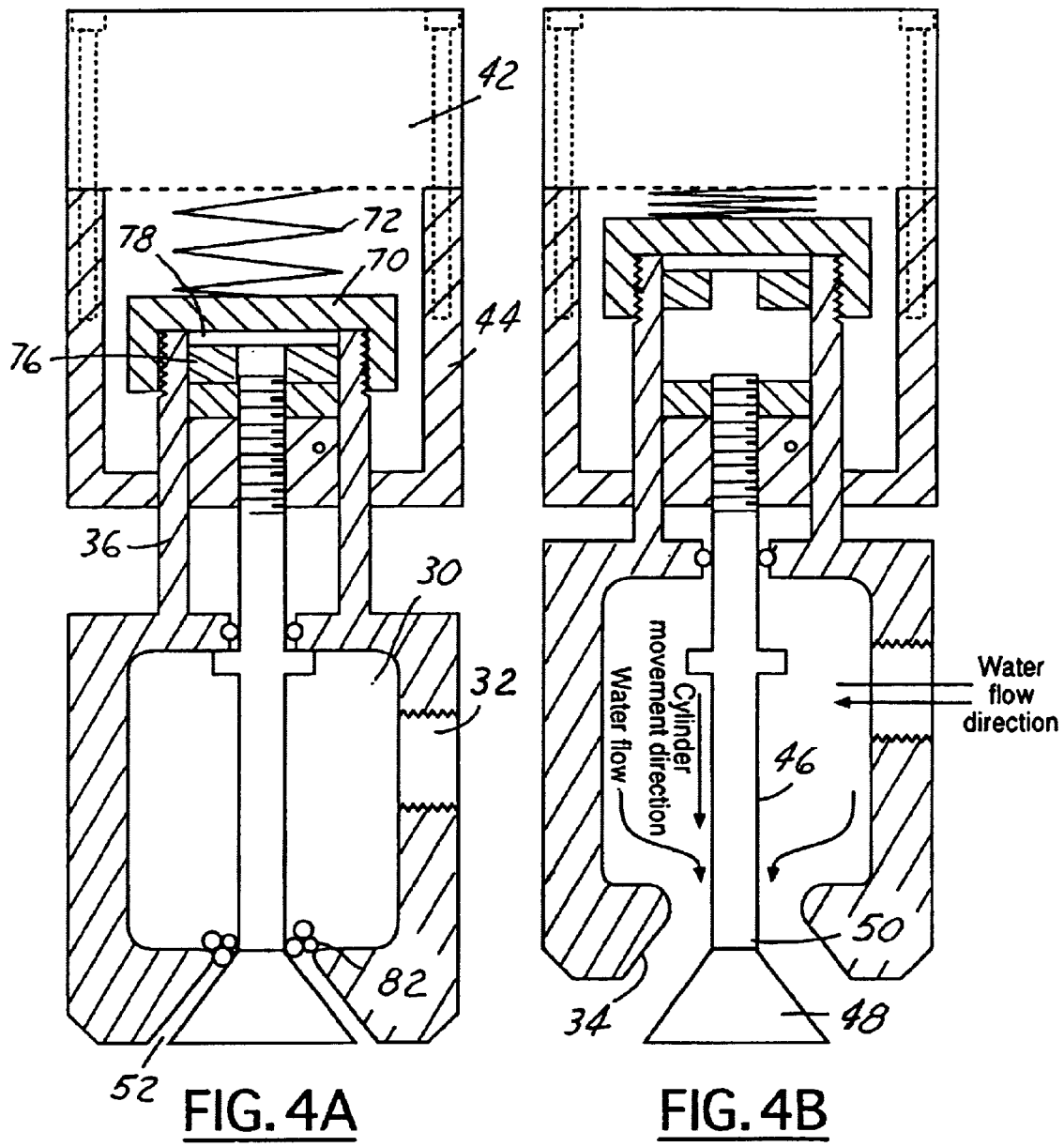

SELF-CLEANING NOZZLES OF WET SCRUBBER

BACKGROUND OF THE INVENTION

FIELD OF THE INVENTION

The present invention relates to devices that removes dust particles from gases, and more specifically to a particular category of such devices called wet scrubbers, and more specifically to wet scrubbers with nozzles, and even more specifically to wet scrubbers with self-cleaning nozzles.

The concern of this invention is with air pollution resulting from the emission into the atmosphere of particulate matter and other contaminants. As noted in the Federal Register of Dec. 27, 1996 (Vol. 61, No. 25), "[t]he primary goal of the Clean Air Act is to enhance the quality of the Nation's air resources and to promote the public health and welfare and the productive capacity of its population."

Particulate matter is made up of tiny particles in the atmosphere that can be solid or liquid (except for water or ice) and is produced by a wide variety of natural and manmade sources. Particulate matter includes dust, dirt, soot, smoke and tiny particles of pollutants. Some particles attract and combine with amounts of water so small that they do not fall to the ground as rain. Major sources of particulate pollution are factories, power plants, trash incinerators, motor vehicles, construction activity, fires, and natural windblown dust. Particles below 10 microns in size (about seven times smaller than the width of a human hair) are more likely to travel deep in the respiratory system, and be deposited deep in the lungs where they can be trapped on membranes. If trapped, they can cause excessive growth of fibrous lung tissue, which leads to permanent injury. Children, the elderly, and people suffering from heart or lung disease are especially at risk. Particles of 10 microns or less are also referred to as PM10.

Electrostatic precipitators, which have been used for particulate control since 1923, use electrical fields to remove particulate from boiler flue gas. Inasmuch as precipitators act only on the particulate to be removed, and only minimally hinder flue gas flow, they have very low-pressure drops, and thus low energy requirements and operating costs. The main drawback of a conventional electrostatic precipitator, apart from requiring a high voltage supply, is that the contaminants collected on the collecting electrode tend to adhere thereto. This makes it necessary, on occasion, to shut down the precipitator in order to scale off the accumulated dirt.

Fabric filter collectors are conceptually simple: by passing flue gas through a tightly woven fabric, particulate in the flue gas will be collected on the fabric by sieving and other mechanisms. The dust cake, which forms on the filter from the collected particulate, can contribute significantly to collection efficiency. Practical application of fabric filters requires the use of a large fabric area in order to avoid an unacceptable pressure drop across the fabric.

Cyclones use centrifugal force to separate particulate from gas streams, and belong to the broader family of mechanical collectors, which use a variety of mechanical forces to collect particulate. A multiple cyclone is an array of a large number of small (several inch diameter) cyclones in parallel. Multiple cyclones have overall mass removal efficiencies of 70–90%. However, cyclone collection efficiencies fall off rapidly with particle size, so that control of fine particulate (PM-2.5) is limited.

Wet scrubbers are based on the collection of particles in liquid droplets, and scrubber design therefore is optimized for droplet creation. In venturi scrubbers, which are commonly used for particulate collection, the scrubbing liquid and flue gases accelerate through a converging section of duct into a narrow throat, and then pass through the throat into a diverging section. In the throat, very high gas velocity shears the scrubbing liquid into a cloud of very fine droplets, which collect particles.

The water droplets are thoroughly mixed with the dirty air, and the solid pollutants in gas air are thoroughly wetted. The wet solid pollutants, being relatively heavy, are deflected downward through the action of the baffles and reduced air velocities into the water reservoir. A constant-volume air control means interposed between the chamber and the source of polluted air, such as dirty air from an incinerator or the like, contains a primary air inlet duct and a secondary air inlet duct where the air through each duct is controlled by a damper. The dampers of the two ducts are coupled to operate complementary to each other to provide a constant air flow to the chamber for various flows of polluted air directed to the scrubber through the primary air inlet duct.

Wet Scrubber systems dealing with acid Gas/SO rely on a chemical reaction with a sorbent to remove a wide range of pollutants, including sulfur dioxide ($SO_2$), acid gases, and air toxins, from flue gases. When used to remove or "scrub" $SO_2$ from the flue gas, these devices are commonly called flue gas desulfurization (FGD) or scrubber systems. FGD or scrubber systems are generally classified as either "wet" or "dry". Wet scrubbers are increasingly recognized as an important part of a multi-pollutant control program. In a wet scrubber, a liquid sorbent is sprayed into the flue gas in an absorber vessel. The gas phase or particulate pollutant comes into direct contact with a sorbent liquid and is dissolved or diffused (scrubbed) into the liquid. The liquid interface for gas and particle absorption include liquid sheets, wetted walls, bubbles and droplets.

In the wet processes, a wet slurry waste or by-product is produced. Most wet FGD systems use alkaline slurries of limestone or slaked lime as sorbents. Sulfur oxides react with the sorbent to form calcium sulfite and calcium sulfate. Uptake of the pollutant by the sorbent results in the formation of a wet solid by-product that may require additional treatment, or when oxidized, results in a gypsum by-product that can be sold. Scrubber technologies for wet scrubbing of gaseous pollutants can achieve extremely high levels of multi-pollutant control, including acid gases, $SO_2$, fine particulates and heavy metals (e.g., mercury) from utility and industrial coal-fired boilers, waste-to-energy systems, and other industrial processes.

Wet scrubber technology can be applied to difficult processes such as gas absorption and particle collection, treating combustible particles, and removal of wet, sticky or corrosive particles. Wet scrubbers are used in industrial process mercury removal and to remove ionic forms of mercury from the gas stream of coal-fired power generation facilities. Wet scrubbers generally have relatively small space requirements, low capital cost, and are able to process high temperature, high acidity, and high humidity flue gas streams. Scrubber costs have continued to decrease, largely because of technical innovations. Scrubber energy requirements have also continued to decrease, helping to lower operating costs.

FGD systems are an increasingly significant part of a multi-pollutant control approach, even as the energy requirements of these systems are decreasing to where these systems now consume only about 1% of total boiler output. Where low-cost high-sulfur fuels are available, or where the required reductions are very high, scrubbing is often a viable control option. New wet scrubbers routinely achieve $SO_2$ removal efficiencies of 95%, with some scrubbers achieving removal efficiencies of up to 99%. Scrubbers have been used in the EPA Acid Rain Program on coal-fired boilers, which are significant sources of hydrochloric acid (HCl) and hydrofluoric acid (HF).

According to the EPA and others sources, both wet and dry scrubbers have been shown to reduce HCl emissions by 95% and more, and wet scrubbers have been shown to reduce HF emissions by more than one-third. Others have reported ranges of 87–94% removal of chlorine and 43–97% removal of fluorine by both wet and dry scrubbers. In addition, wet scrubbers also provide significant removal of arsenic, beryllium, cadmium, chromium, lead, manganese, and mercury from flue gas. Wet scrubbers can be generally grouped by geometric designs and method for gas-liquid contact. Several groupings include packed-bed, counter-flow, cross-flow, bubble-plate, open spray (single and double loop) tower, dual-flow tray, cyclonic, and venturi designs. However, there are many proprietary systems designed around specific industry needs. Design and operating parameters include scrubber geometrical shape, liquid spray or injection locations, gas residence time, gas velocities, gas and liquid temperatures, gas and liquid pressure drop, and, liquid/gas flow rate ratio.

Of prior art interest are the wet disclosed in the Sibley et al. U.S. Pat. No. 4,609,386. In the Sibley et al scrubber, pollutants are removed from a gaseous or air stream by passing the polluted air through a scrubber chamber in a tortuous path, the flowing air being contacted by water sprayed into the chamber by nozzles. This action causes pollutants to be transferred from the polluted air to the water, thereby cleaning the air. Although the wet scrubbers in the patents above is highly effective in removing contaminants from the gaseous stream being discharged into the atmosphere, it does not overcome the problem of the wet scrubber being clogged by pollutants, fragments and other byproducts of the waste gas cleaning process. As a result, the nozzles becomes clogged which leads to a decrease in efficiency of the wet scrubber and increase in the air pollution. Furthermore, the EPA policy requires a shutdown of the system in order to remove the pollutants from the wet scrubber. This leads to frequent interruptions and an increase in production, labor, and maintenance costs.

SUMMARY OF INVENTION

Therefore, the object of the present invention is to provide a method of waste gas treatment capable of cleaning nozzles of a wet scrubber that does not require shutting down the whole system.

Another object of the present invention is to provide a wet scrubber with nozzles capable of self-cleaning when clogged with pollutant particles.

One more object of the present invention is to provide a nozzle with the quality of self-cleaning when clogged.

According to the present invention, a method of waste gas treatment with the use of a wet scrubber conventionally provides for pumping water under pressure through a pipe into at least one nozzle, passing waste gases through out of the scrubber, and spraying water in the scrubber being the nozzle to wet envelope pollutant particles in the waste gases preventing them from being discharged into atmosphere.

The method additionally provides for monitoring the pressure in the pipe, and, upon exceeding by the pressure a preset value due to clogging an outlet orifice of the nozzle by the pollutants, causing the outlet orifice to increase. Due to that, the pollutant particles fall down the outlet orifice unclogging the orifice.

A wet scrubber according to the present invention is composed of a scrubber body, in which at least one nozzle is installed, a water reservoir and a pipe, through which a pump pumps water from the reservoir into the nozzle. The scrubber also comprises means monitoring water pressure in the pipe, control means controlled by the monitoring means when the water pressure exceeds a preset value due to clogging of the nozzle by pollutant particles, and means unclogging the nozzle in response to a signal from the control means.

The monitoring means may include pressure sensor/transmitter, the control means may include a control panel generating an electric signal to the nozzle upon receiving a signal from the sensor/transmitter of the water pressure in the pipe exceeding a preset value, and the unclogging means includes means enlarging an outlet orifice of the nozzle.

Those means enlarging the outlet orifice include an electromagnetic coil in the nozzle and making the nozzle with the structure where the outlet orifice is formed as an outwardly diverging conical bore in a bottom of a body of the nozzle, in which bore a coaxial conical member is installed. In this way, upon energizing the electromagnetic coil the body moves toward the coil and the distance between walls of the conical bore and the coaxial conical member defining the outlet orifice increases enlarging the outlet orifice, whereby the pollutant particles fall down the outlet orifice unclogging it. Otherwise, the body may be stationary, and the coil or a portion thereof moves toward the body with the same effect.

A self-cleaning nozzle according to the present invention is proposed to be made comprising a body defined by a top, a bottom, and walls, an inlet in the wall, through which inlet water is supplied into the nozzle, an outwardly diverging conical bore in the bottom, in which bore a coaxial conical member is installed. An outlet orifice, through which water is sprayed out of the nozzle, is defined by a distance between walls of the bore and the coaxial conical member. Also provided is an electromagnetic coil, the coaxial conical member being rigidly affixed to the coil, and the body having a spring-biased connection to the coil. Thanks to this structure, when the coil is energized, the body is attracted towards the coil compressing the spring, the distance between walls of the bore and the coaxial conical member increases, and pollutant particles clogging the outlet orifice are caused to fall down the outlet orifice unclogging the orifice. Alternatively, the body may be stationary and fixed to the scrubber, for example via lugs, and the coil structure or a portion thereof such as armature moves toward the body with the same effect.

The nozzle may also comprise a coil connector, to which the electromagnetic coil is rigidly attached, and a nozzle linker rigidly attached to the coaxial cone member and threaded into the coil connector, the coaxial cone member being preferably made an integral part of the nozzle linker.

There are at least two prongs circumferentially attached to the body, which prongs are preferably made integral parts of the body. The prongs are provided with external thread on their ends distant from the body.

The bottom of the connector is made with bores, the number of the bores corresponding to the number of the prongs. The prongs extend into the connector through the bores, with a metallic blind screw threaded onto the threaded ends of the prongs. Between the blind screen and the coil, a spring is installed so that when the coil is energized, the blind screw is attracted to the coil compressing the spring and leading the throngs and the body. Due to that, the distance between walls of the bore and the coaxial conical member increases that causes pollutant particles clogging the outlet orifice to fall down the outlet orifice unclogging the orifice. It is also possible that the body is attached to the scrubber and thus made stationary, whereas the coil structure or a portion thereof such as armature moves toward the body shifting the conical member forward and thus increasing the bore.

BRIEF DESCRIPTION OF DRAWINGS

The above-mentioned and other objects, advantages and features of the present invention will be in more detail illustrated in and will become more apparent to those skilled in the art from the ensuing specification and subjoined claims, when considered in conjunction with the accompanying drawings, in which:

FIG. 4a is a block diagram of the nozzle according to the present invention before cleaning; and FIG. 4b is a block diagram of the nozzle according to the present invention after cleaning.

DETAILED DESCRIPTION OF THE PREFERRED EMBODIMENT

Figure 1:
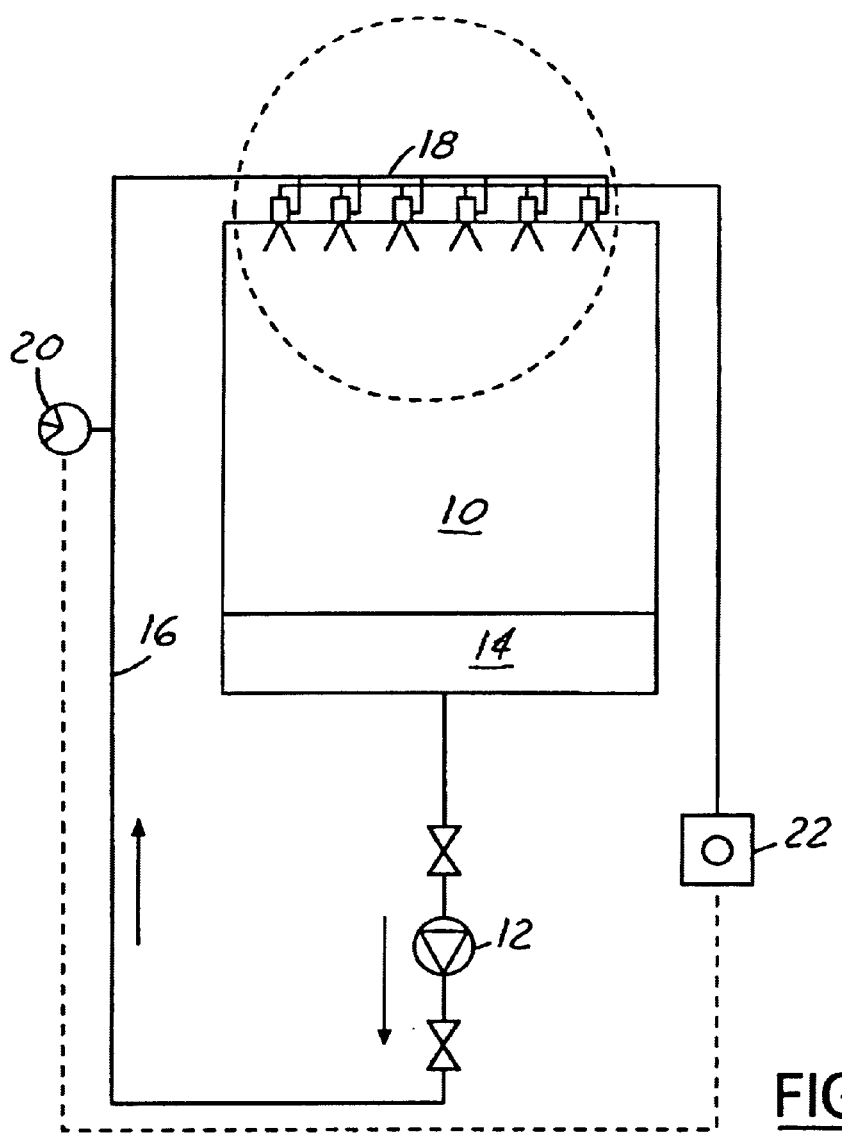
FIG. 1 is a schematic diagram of a wet scrubber with self-cleaning nozzles according to the present invention.

FIG. 1 schematically illustrates the overall process of waste gas treatment based on the use of a wet scrubber according to the present invention. In a wet scrubber 10, a pump 12 transfers water from a reservoir 14 through a pipe 16 to automatic cleaning nozzles 18. Water is then sprayed from the nozzles 18 into waste gases passing the wet scrubber 10, and pollutants are separated from the gases to be disposed of later.

During the cleaning process, the nozzles 18 are often clogged by the pollutants and need to be cleaned. A pressure sensor/transmitter 20 is installed to monitor water pressure in the pipe 16. When the nozzles 18 become clogged, the pressure increases beyond a preset value, and the sensor/transmitter 20 causes a control panel 22 to start automatic cleaning the nozzles. In the absence of the pressure transmitter 20, the control panel can be turned on manually when the nozzles 18 become clogged.

Figure 2:
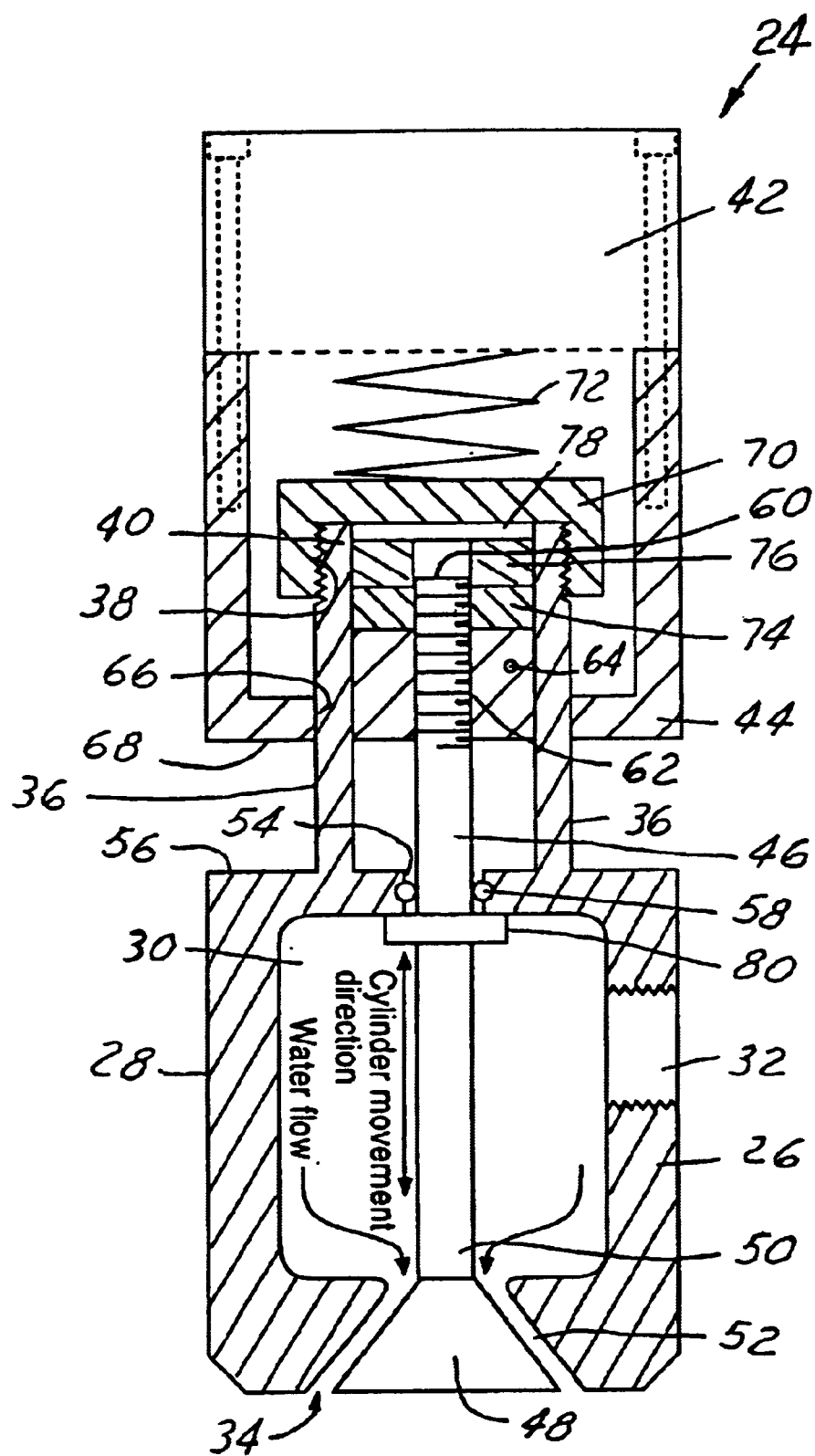
FIG. 2 is a block diagram of a nozzle with automatic cleaning according to the present invention.

FIG. 2 illustrates in more detail an automatic cleaning nozzle according to the present invention. The nozzle 24 comprises a substantially cylindrical nozzle body 26 with walls 28 defining a chamber 30 with an inlet 32, through which the pump 12 supplies water into the chamber 30, and an outlet orifice 34. The orifice 34 is made as an outwardly widening cone.

Circumferentially attached to the body 26 are four prongs 36 that are provided with external thread 38 on their ends 40. The number of the prongs can differ from four. There can be two prongs extending circumferentially substantially enough to secure mechanical rigidity of the whole structure; there can be provided more than four of them. The prongs can be made an integral part of the nozzle body. There is also provided an electromagnetic coil 42 affixed to a cylindrical coil connector 44. Coaxially positioned in the chamber 30 is a nozzle linker 46 with a cone flare 48 at its end 50. The cone flare 48 is placed in the outlet orifice 34 in such a way that a ring channel 52 is formed, through which channel the water supplied to nozzle 18 via the inlet 32 is sprayed out of the nozzle.

Figure 3:
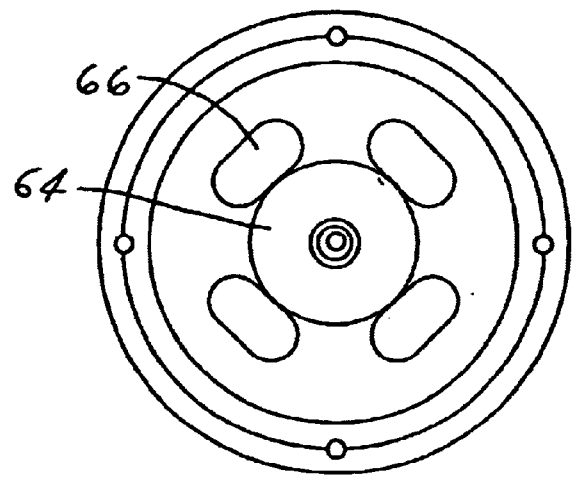
FIG. 3 is a top view of a coil connector of the nozzle according to the present invention.

The linker 46 passes through a bore 54 in an upper wall 56 of the nozzle body 26, with an O-ring 58 installed in the bore 54. Another end 60 of the linker 46 is provided with thread 62, so as to have the linker threaded in an elevated central portion 64 of the coil connector 44. On the other hand, the prongs 36 also extend into the connector 44 passing through four respective bores 66 in its bottom 68. One of possible configurations of the bores 66 is shown in FIG. 3. Screwed onto the thread 38 of prongs 36 is a metallic blind screw 70. The coil 42 is attached to the coil connector 44 by any suitable means. It can for example be glued to the connector or screwed to it. A spring 72 is placed between the coil 42 and the blind screw 70.

Also provided in the nozzle structure is a retaining nut 74 securing the linker 46 in the connector 44, and a fixing ring 76 with a pad 78. The linker 46 has a stop ring 80 that, along with the fixing ring 76 and pad 78, defines the minimal size of the ring channel 52.

In operation, water under a preset pressure comes through the inlet 32 into the chamber 30. From the chamber 30, water is sprayed out through the ring channel 52. In the course of time, the ring channel 52 of the nozzle becomes clogged with garbage, or fragments of packing, or other particles generally shown as 82 in FIG. 4a. The clogging results in rising pressure in the pipe 16. When the pressure exceeds a preset value, the pressure sensor/transmitter 20 turns on. The sensor/transmitter sends a signal to the control panel 22, and the latter sends a signal to the electromagnetic coil 42. The electromagnetic field generated by the coil causes the metallic blind screw 70 to magnetically attract to the coil 42 compressing the spring 72. The movement of the blind screw 70 causes the nozzle body 26 rigidly connected to the blind screw 70 by prongs 36 to also move up—relative to the coil connector 44 and the nozzle linker 46 rigidly connected thereto.

As can be seen in FIG. 4b, this movement increases clearance between the outlet orifice 34 and the cone flare 48 at the end 50 of the linker 46, and thus the size of the ring channel 52. Due to this enlargement, all the particles 82 that clogged the nozzle fall out of it, the nozzle's capacity for work restores, the pressure returns to its normal values that disables the control panel 22 and, consequently, the coil 42. When the signal to the coil ends, the spring 72 returns the nozzle body 26 back to its initial position shown in FIG. 4a. Fixing ring 76 and the pad 78 preclude further movement down of the nozzle body 26.

The use of the present invention allows lowering operational costs due to reducing time for maintenance and saving manpower expenses. Cleaning the nozzles will not require to shutdown the system.

Though the present invention has been fully described in the foregoing preferred embodiments and their alternatives, it is to be clearly understood that various modifications apparent to those skilled in the art can be made without departing from the spirit and scope of the invention. For example, as mentioned in the above, it may not be the body of the nozzle that moves toward the coil structure but rather vice versa, the effect resulting from either movement being the same. All of these modifications are therefore construed as being covered by the claims that follow.

What is claimed is:

1. A method of waste gas treatment with the use of a wet scrubber comprising the steps of:
   pumping water under pressure through a pipe into at least one nozzle;
   passing waste gases through said scrubber; and
   spraying water in the scrubber out of the at least one nozzle, to thereby envelope pollutant particles in the waste gases and prevent them from being discharged into atmosphere,
   said method additionally comprising the steps of:
      monitoring the pressure in the pipe, and, upon exceeding by the pressure a preset value due to clogging an outlet orifice of the at least one nozzle by the pollutants,
      causing the outlet orifice to increase, whereby the pollutant particles fall down the outlet orifice unclogging the same.

2. A wet scrubber comprising a scrubber body, in which at least one nozzle is installed, a water reservoir and a pipe, through which a pump pumps water from the reservoir into the at least one nozzle, means monitoring water pressure in the pipe, control means controlled by the monitoring means when the water pressure exceeds a preset value due to clogging of the at least one nozzle by pollutant particles, and means unclogging the at least one nozzle in response to a signal from the control means.

3. The wet scrubber according to claim 2, wherein the monitoring means includes pressure sensor/transmitter.

4. The wet scrubber according to claim 2, wherein the control means includes a control panel generating an electric signal to the at least one nozzle upon receiving a signal of the water pressure in the pipe exceeding a preset value.

5. The wet scrubber according to claim 2, wherein the unclogging means includes means enlarging an outlet orifice of the at least one nozzle.

6. The wet scrubber according to claim 5, wherein the means enlarging the outlet orifice include an electromagnetic coil in the at least one nozzle and a structure of the at least one nozzle where the outlet orifice is formed as an outwardly diverging conical bore in a bottom of a body of the at least one nozzle, in which bore a coaxial conical member is installed, so that upon energizing the electromagnetic coil relative arrangement of the body and the coil changes in the way to increase the distance between walls of the conical bore and the coaxial conical member defining the outlet orifice, thus enlarging the outlet orifice, whereby the pollutant particles fall down the outlet orifice unclogging the same.

7. A self-cleaning nozzle comprising
   a body defined by a top, a bottom, and walls,
   an inlet in the wall, through which inlet water is supplied into the nozzle,
   an outwardly diverging conical bore in the bottom, in which bore a coaxial conical member is installed, so that an outlet orifice, through which water is sprayed out of the nozzle, is defined by a distance between walls of the bore and the coaxial conical member,
   an electromagnetic coil,
   the coaxial conical member being rigidly affixed to the coil, and the body having a spring-biased connection to the coil,
   so that when the coil is energized, relative arrangement of the body and the coil changes in the way to increase the distance between walls of the bore and the coaxial conical member, whereby pollutant particles clogging the outlet orifice are caused to fall down the outlet orifice unclogging the same.

8. The nozzle according to claim 7, further comprising a coil connector, to which the electromagnetic coil is rigidly attached.

9. The nozzle according to claim 8, further comprising a nozzle linker rigidly attached to the coaxial cone member and threaded into the coil connector.

10. The nozzle according to claim 9, wherein the coaxial cone member is made an integral part of the nozzle linker.

11. The nozzle according to claim 9, further comprising at least two prongs circumferentially attached to the body.

12. The nozzle according to claim 11, wherein the prongs are made integral parts of the body.

13. The nozzle according to claim 11, where the prongs are provided with external thread on their ends distant from the body.

14. The nozzle according to claim 13, wherein a bottom of the connector is made with bores, the number of the bores corresponding to the number of the prongs, the prongs extend into the connector through the bores, a metallic blind screw is threaded onto the threaded ends of the prongs, and a spring is installed between the blind screen and the coil, so that when the coil is energized, the blind screw is attracted to the coil compressing the spring and leading the throngs and the body, whereby the distance between walls of the bore and the coaxial conical member increases causing pollutant particles clogging the outlet orifice to fall down the outlet orifice unclogging the same.

* * * * *